United States Patent
Grichnik et al.

(10) Patent No.: US 7,813,869 B2
(45) Date of Patent: Oct. 12, 2010

(54) PREDICTION BASED ENGINE CONTROL SYSTEM AND METHOD

(75) Inventors: Anthony Grichnik, Peoria, IL (US); Amit Jayachandran, Peoria, IL (US); Mary L. Kesse, Peoria, IL (US); Wade S. Willden, San Diego, CA (US); Michael Seskin, Cardiff, CA (US)

(73) Assignee: Caterpillar Inc, Peoria, IL (US)

( * ) Notice: Subject to any disclaimer, the term of this patent is extended or adjusted under 35 U.S.C. 154(b) by 642 days.

(21) Appl. No.: 11/730,363

(22) Filed: Mar. 30, 2007

(65) Prior Publication Data

US 2008/0243354 A1 Oct. 2, 2008

(51) Int. Cl.
*G06F 19/00* (2006.01)
*B60T 7/12* (2006.01)

(52) U.S. Cl. .................. 701/114; 701/108; 701/109
(58) Field of Classification Search ................ 701/101, 701/102, 108, 109, 111, 114, 115
See application file for complete search history.

(56) References Cited

U.S. PATENT DOCUMENTS

| | | | |
|---|---|---|---|
| 4,136,329 A | 1/1979 | Trobert | |
| 4,533,900 A | 8/1985 | Muhlberger et al. | |
| 5,265,416 A * | 11/1993 | Hamburg et al. | 60/274 |
| 5,720,261 A * | 2/1998 | Sturman et al. | 123/446 |
| 5,893,047 A * | 4/1999 | Gimblett et al. | 702/33 |
| 5,954,030 A * | 9/1999 | Sturman et al. | 123/446 |
| 6,195,648 B1 | 2/2001 | Simon et al. | |
| 6,240,343 B1 | 5/2001 | Sarangapani et al. | |
| 6,275,765 B1 * | 8/2001 | Divljakovic et al. | 701/102 |
| 6,584,768 B1 | 7/2003 | Hecker et al. | |
| 6,594,989 B1 | 7/2003 | Hepburn et al. | |
| 6,692,851 B2 * | 2/2004 | Keskula et al. | 429/13 |
| 6,847,188 B2 * | 1/2005 | Keskula et al. | 320/101 |
| 6,865,883 B2 | 3/2005 | Gomulka | |
| 7,013,871 B2 * | 3/2006 | Zhu et al. | 123/406.21 |
| 7,117,079 B2 | 10/2006 | Streichsbier et al. | |
| 7,499,842 B2 | 3/2009 | Grichnik et al. | |
| 7,559,309 B2 * | 7/2009 | Winstead | 123/198 F |
| 7,565,333 B2 | 7/2009 | Grichnik et al. | |
| 2004/0088102 A1 * | 5/2004 | Daniels et al. | 701/108 |
| 2004/0139041 A1 | 7/2004 | Grichnik | |
| 2004/0151955 A1 * | 8/2004 | Keskula et al. | 429/13 |
| 2005/0126537 A1 * | 6/2005 | Daniels et al. | 123/406.14 |
| 2005/0205048 A1 * | 9/2005 | Winstead | 123/198 F |
| 2006/0129289 A1 | 6/2006 | Kumar et al. | |

(Continued)

FOREIGN PATENT DOCUMENTS

EP 1367248 12/2003

(Continued)

*Primary Examiner*—John T Kwon
(74) *Attorney, Agent, or Firm*—Finnegan, Henderson, Farabow, Garrett & Dunner LLC

(57) ABSTRACT

A prediction based engine control system is disclosed. The engine control system may have sensor configured to sense a current engine operation and generate a corresponding signal and a controller in communication with the sensor. The controller may be configured to receive the signal, compare the current engine operation to an allowable range of engine operation, predict a future engine operation based on the signal, and limit current engine operation based on the prediction, even when the current engine operation is within the allowable range of operation.

24 Claims, 3 Drawing Sheets

U.S. PATENT DOCUMENTS

| | | |
|---|---|---|
| 2006/0137347 A1 | 6/2006 | Stewart et al. |
| 2006/0201141 A1 | 9/2006 | Miller et al. |
| 2006/0230097 A1 | 10/2006 | Grichnik et al. |
| 2007/0162216 A1 * | 7/2007 | Choi et al. .................. 701/103 |
| 2008/0183444 A1 | 7/2008 | Grichnik et al. |
| 2008/0201054 A1 | 8/2008 | Grichnik et al. |

FOREIGN PATENT DOCUMENTS

| | | |
|---|---|---|
| GB | 2363210 | 12/2001 |

* cited by examiner

PREDICTION BASED ENGINE CONTROL SYSTEM AND METHOD

TECHNICAL FIELD

This disclosure relates generally to an engine control system and, more particularly, to an engine control system and method that derates current engine operation based on performance predictions.

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. As the exhaust emission standards become more stringent, guidelines regarding engine operation outside of the emission regulations are being contemplated.

One such guideline may include requiring deactivation of an engine when the exhaust emissions from the engine exceed a threshold, and preventing operation of the engine thereafter until the threshold can been cleared. One example is described in U.S. Pat. No. 4,136,329 (the '329 patent) by Trobert patented on Jan. 23, 1979. The '329 patent discloses a system that includes sensing elements that are responsive to respective engine operating conditions, such as exhaust emissions, to provide a signal when the respective conditions are adverse to the proper operation of the engine, such as when exhaust emissions exceed certain thresholds. If a condition exceeds a threshold, such as a regulatory limit, a warning indication is given to the operator and a timer is started. At the termination of the timer, the engine is disabled.

Although the apparatus of the '329 patent may suitably prevent excessive amounts of NOx from being expelled to the environment, it may be problematic. For example, a vehicle could become inconveniently stranded, costing the owner of the vehicle considerable time and resources. It may also create a safety issue, if an operator is prevented from controlling the machine or equipment properly. Furthermore, the apparatus of the '329 patent relies only on the currently sensed engine operating parameter and is, thus, a reactive system that only operates after a limit has been exceeded rather than preventing the limit from being exceeded.

The system of the present disclosure solves one or more of the problems set forth above.

SUMMARY OF THE INVENTION

One aspect of the present disclosure includes a prediction based engine control system. The engine control system may have a sensor configured to sense a current engine operation and generate a corresponding signal, and a controller in communication with the sensor. The controller may be configured to receive the signal, compare the current engine operation to an allowable range of engine operation, and predict future engine performance based on the signal. The controller may further be configured to limit current engine operation based on the prediction, even when the current engine operation is within the allowable range of operation.

Another aspect of the present disclosure includes a method of controlling an engine. The method may include receiving a signal indicative of a current engine operation and comparing the signal to an allowable range of engine operation. The method may also include predicting future engine performance based on the comparison and limiting current engine operation based on the prediction, even when the current engine operation is within the allowable range of engine operation.

DETAILED DESCRIPTION

Figure 1:
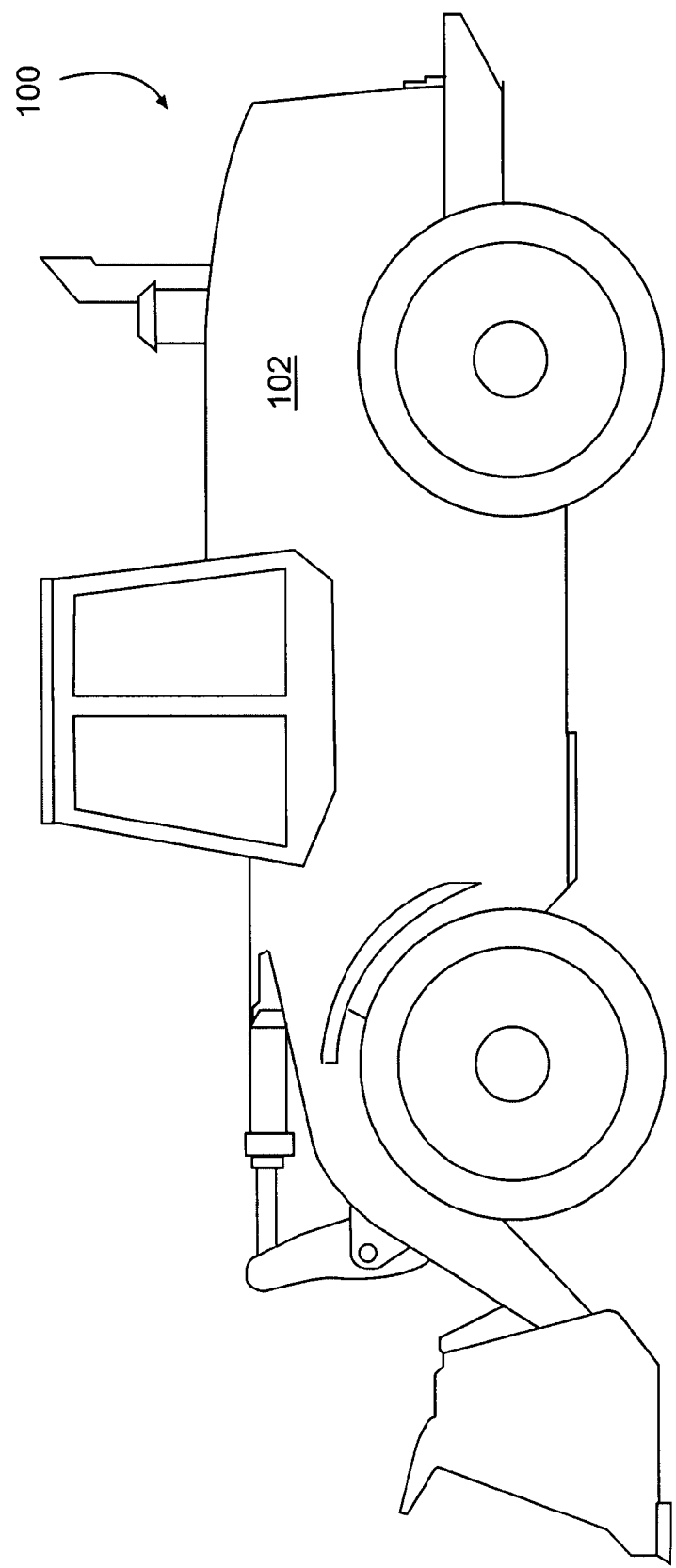
FIG. 1 is a diagrammatic illustration of an exemplary machine in which features and principles consistent with certain disclosed embodiments may be incorporated.

FIG. 1 illustrates an exemplary machine 100 in which features and principles consistent with certain disclosed embodiments may be incorporated. Machine 100 may include any type of fixed or mobile machine that performs some type of operation associated with a particular industry, such as mining, construction, farming, transportation, etc. and operates between or within work environments (e.g., construction site, mine site, power plants and generators, on-highway applications, etc.). Non-limiting examples of mobile machines include commercial machines, such as trucks, cranes, earth moving machines, mining machines, backhoes, material handling equipment, farming equipment, and any other type of movable machine that operates in a work environment. Machine 100 may also include any type of non-commercial machines such as cars, vans, and other machines. Machine 100 may include a power system 102 the provides power to move machine 100.

Figure 2:
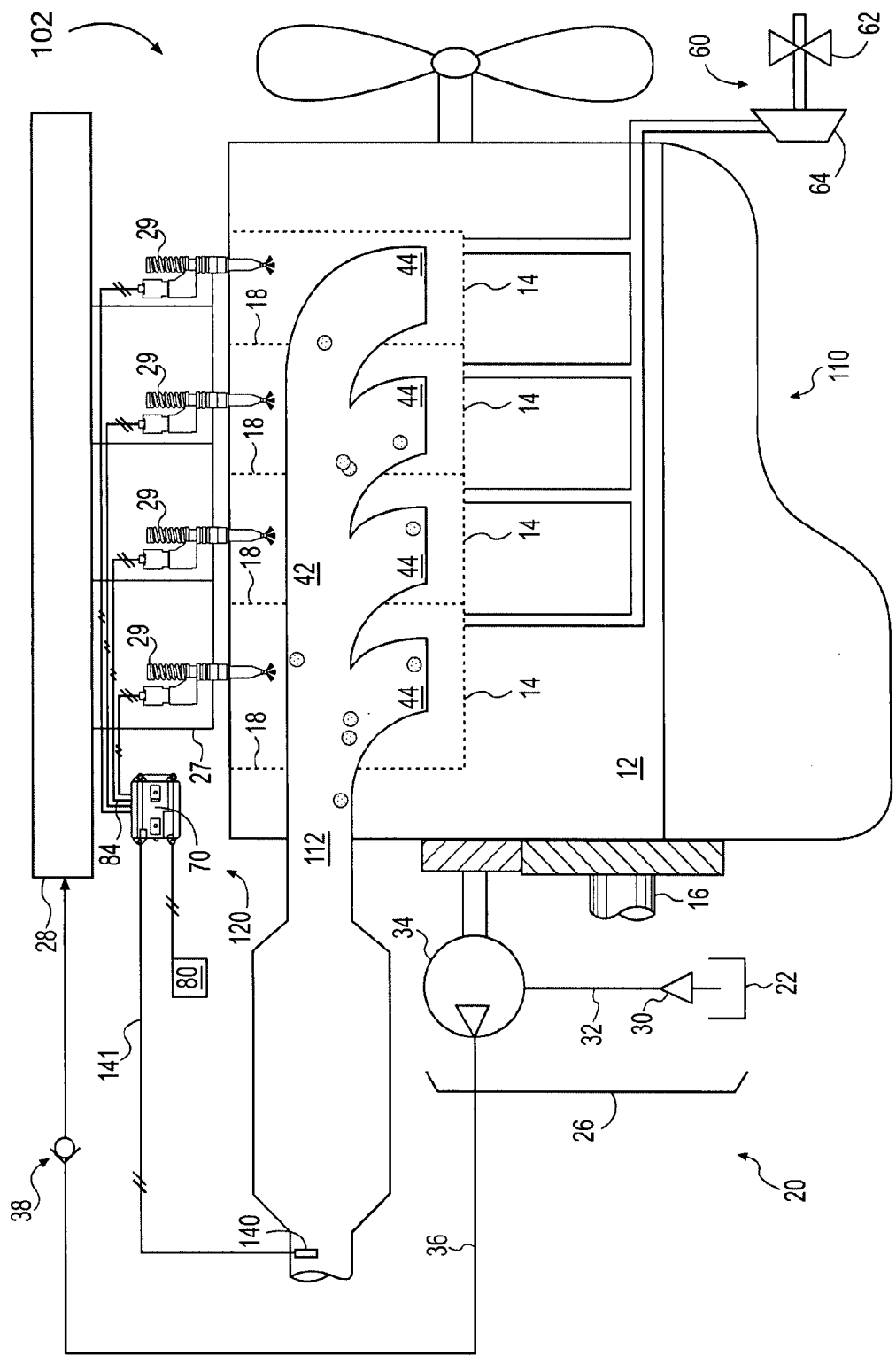
FIG. 2 is a schematic and diagrammatic illustration of an exemplary power system for use with the machine of FIG. 1.

As shown in FIG. 2, power system 102 may include an engine 110 and a control system 120. For the purposes of this disclosure, engine 110 is depicted and described as a four-stroke diesel engine. One skilled in the art will recognize, however, that power system 102 may include any other type of internal combustion engine such as, for example, a gasoline engine, a gaseous fuel-powered engine, or a turbine engine.

Engine 110 may include an engine block 12 that together with a plurality of cylinder heads 18 at least partially defines a plurality of combustion chambers 14. In the illustrated embodiment, engine 110 includes four combustion chambers 14. However, it is contemplated that engine 110 may include a greater or lesser number of combustion chambers 14 and that the combustion chambers 14 may be disposed in an "in-line" configuration, a "V" configuration, or any other suitable configuration.

As also shown in FIG. 2, engine 110 may include a crankshaft 16 that is rotatably disposed within engine block 12. A connecting rod (not shown) may connect a plurality of pistons (not shown) to crankshaft 16 so that a sliding motion of each piston within the respective combustion chamber 14 results in a rotation of crankshaft 16. Similarly, a rotation of crankshaft 16 may result in a sliding motion of the pistons.

Engine 110 may also include a fuel system 20, an air induction system 60, and an exhaust system 112. Fuel system 20 may direct pressurized fuel into combustion chambers 14 of engine 110. Air induction system 60 may direct air into combustion chambers 14. Air and fuel may be combusted within engine 110 to produce power and a flow of exhaust. Exhaust system 112 may direct the exhaust to the atmosphere. The power produced by engine 110 may be used to propel machine 100 and/or move one or more implements.

Fuel system 20 may include components that cooperate to deliver injections of pressurized fuel into each combustion chamber 14. Specifically, fuel system 20 may include a tank 22 that holds a supply of fuel, and a fuel pumping arrangement 26 configured to pressurize the fuel and direct one or more streams of pressurized fuel to a manifold 28.

Tank 22 may constitute a reservoir that holds a supply of fuel. The fuel may include, for example, diesel fuel, gasoline, kerosene, a heavy fuel, or any other type of fuel known in the art. It is also contemplated that fuel system 20 may be connected to multiple separate fuel tanks, if desired.

Fuel pumping arrangement 26 may include one or more pumping devices that function to increase the pressure of the fuel. In one example, the fuel pumping arrangement 26 may include a high pressure source 34 and a low pressure source 30 disposed in series and fluidly connected by way of a fuel line 32. Low pressure source 30 may embody a transfer pump that provides low pressure feed to high pressure source 34, while high pressure source 34 may receive the low pressure feed and increase the pressure of the fuel to as much as 300 MPa. High pressure source 34 may be connected to manifold 28 by way of a fuel line 36. A check valve 38 may be disposed within fuel line 36 to provide uni-directional flow of fuel from the fuel pumping arrangement 26 to manifold 28.

Fuel injectors 29 may be disposed within cylinder heads 18 and connected to manifold 28 by way of a plurality of fuel lines 27. Each fuel injector 29 may be operable to inject an amount of pressurized fuel into an associated combustion chamber 14 at predetermined timings and fuel pressures. The timing of fuel injection into combustion chamber 14 may be synchronized with the motion of the associated piston. For example, fuel may be injected as the piston nears a top-dead-center position in a compression stroke to allow for compression-ignited-combustion of the injected fuel. Alternatively, fuel may be injected as the piston begins the compression stroke heading towards a top-dead-center position for homogenous charge compression ignition operation. Fuel may also be injected as the piston is moving from a top-dead-center position towards a bottom-dead-center position during an expansion stroke for a late post injection to create a reducing atmosphere for aftertreatment regeneration. In order to accomplish these specific injection events, control system 120 may request an injection of fuel at a specific start and/or end of injection (SOI or EOI) timing and specific start and/or end of injection (SOP or EOP) pressure.

By altering the injection timing and pressure characteristics, control system 120 may alter the performance of engine 110. In one example, control system 120 may derate engine 110. That is, control system 120 may decrease the amount of fuel injected, or vary (i.e., advance or retard) the timing and/or pressure of the injection, to lower the power output of engine 110, which may result in a similar decrease in the NOx emissions. In this way, control system 120 may derate engine 110 lower NOx output and/or to maintain compliance with a regulated level of emissions.

Air induction system 60 may introduce charged air into combustion chamber 14 of engine 110. Air induction system 60 may include an induction valve 62 and a compressor 64. It is contemplated that additional components may be included within air induction system 60 such as, for example, one or more air coolers, additional valving, one or more air cleaners, one or more waste gates, and other components known in the art.

Control system 120 may additionally or alternatively derate engine 110 by adjusting air flow characteristics. In one example, control system 120 may decrease the air to fuel ratio combusted in combustion chambers 14 to decrease the power output of engine 110. This decrease of power output caused by the manipulation of air induction system 60 may also result in a decrease in exhaust emissions to maintain compliance with a regulated level of emissions.

Exhaust system 112 may direct exhaust from cylinders 14 to the atmosphere and may include an exhaust manifold 42 in fluid communication with exhaust passageway 44 via one or more cylinders 14. It is contemplated that exhaust system 112 may include other components such as, for example, a turbine associated with compressor 64, an exhaust gas recirculation system, a particulate filter or catalyst, or any other exhaust system component known in the art.

Control system 120 may also or alternatively derate engine 110 by adjusting exhaust system characteristics. In one example, control system 120 may decrease available power output to engine 110 by increasing an amount of exhaust gas recirculation, and/or by changing a backpressure of engine 110. Increasing the exhaust gas recirculation may decrease the amount of oxygen available to combustion chamber 14, which may lower the combustion temperature. The lower combustion temperature may result in both a diminished machine 100 capacity, as well as lowered NOx emissions from exhaust system 112 to maintain compliance with a regulated level of emissions.

Control system 120 may include a sensor 140, a controller 70, and a positioning system 80. Sensor 140 may provide control system 120 with a signal indicative of a current engine operating condition, such as NOx emissions, while controller 70 may use the received signal and a computational model to predict a future engine operating condition, such as NOx emissions. Positioning system 80 may provide control system 120 with a geographic location of machine 100.

Sensor 140 may include a physical sensor for sensing a current engine parameter and sending a signal indicative of that measured parameter to controller 70. For example, sensor 140 may include a physical NOx sensor located in the exhaust system 112 that determines the concentration of NOx constituents in the exhaust flow and relays a signal indicative of the current concentration of NOx constituents being released into the atmosphere to controller 70.

Sensor 140 may alternatively include a virtual sensor for providing a signal indicative of a current parameter based on a computational model and at least one measured parameter. In this way, a physical emissions sensor may be unnecessary. Control system 120 may use computer software, hardware, or a combination to generate the value of a current parameter (e.g., NOx emission level) based on a computational model and another sensed parameter (e.g., engine temperature). The sensed parameter used by control system 120 to generate a current parameter may be provided by another physical sensor (not shown), which monitors an engine parameter other than the parameter determined by the virtual sensor. For example, where sensor 140 includes a virtual sensor for determining NOx emissions, control system 120 may use a computational model and a sensed engine temperature to calculate and generate a value of current NOx emissions. In this way, the current NOx emissions may be generated by sensor 140 without a physical emissions sensor in exhaust system 112.

In certain embodiments, sensor 140 may provide levels of regulated constituents emitted from exhaust system 112 of engine 110, such as levels of nitrogen oxides ($NO_x$), sulfur dioxide ($SO_2$), carbon monoxide (CO), total reduced sulfur (TRS), soot (i.e., a dark powdery deposit of unburned fuel residues in emission), and/or hydrocarbon (HC), etc. In particular, $NO_x$ emission level, soot emission level, and HC emission level may be important to normal operation of engine 110 and/or to meet certain environmental requirements. $NO_x$ emission level, soot emission level, and HC emission level may be referred to as regulated emission levels. Other emission levels, however, may also be monitored.

Controller 70 may embody a single microprocessor or multiple microprocessors that include at least a means for controlling an operation of fuel system 20 and a means for predicting a future performance of engine 110. Numerous commercially available microprocessors can be configured to perform the functions of control system 120. Controller 70 may communicate with fuel injectors 29 by way of a plurality of communication lines 84, and with sensor 140 by way of a communication line 141. Control system 120 may also communicate with other components of fuel system 20, air induction system 60, or exhaust system 112, if desired for proper control thereof. It should be appreciated that control system 120 could readily embody a general machine or power unit microprocessor capable of controlling numerous work machine or engine functions. Control system 120 may include all the components required to run an application such as, for example, a memory, a secondary storage device, and a processor, such as a central processing unit or any other means known in the art. Various other known circuits may be associated with control system 120, including power supply circuitry, signal-conditioning circuitry, solenoid driver circuitry, communication circuitry, and other appropriate circuitry.

One or more control maps relating engine operation with various levels of acceptable emissions may be stored within the memory of control system 120. Each of these maps may be in the form of tables, graphs, and/or equations, and include a compilation of data collected from lab and/or field operation of power system 102. Controller 70 may reference these maps and affect the operation of power system 102 accordingly.

Controller 70 may receive a signal provided via sensor 140. Based on this signal, controller 70 may predict various future engine performance parameters used in engine control functions. For example, a signal from a physical emission sensor may be used by controller 70 to predict future exhaust emission concentration. In the alternative, where sensor 140 is virtual, an emission level calculated based on a computational model and at least one measured parameter may be used to predict future exhaust emission concentration.

To predict future engine performance based on a current engine parameter, controller 70 may include any appropriate type of known forecasting system. The forecasting system may utilize a trend analysis wherein controller 70 records an engine operating parameter at certain predetermined intervals and then predicts a future engine operating parameter based on the trend of the recorded parameter. In one example of a forecasting method, controller 70 may record a value of NOx emission once every minute. Then, controller 70 may analyze the recorded NOx emission data over a certain number of past minutes to determine the likely NOx emissions of the next minute. If the trend of NOx emissions suggest that the future emissions will be approaching or exceed a regulatory limit, controller 70 may derate engine 110 to prevent the limit from being exceeded, while maintaining as much operating capacity of machine 100 as possible. In this manner, an operator may be given an opportunity to correct the problem causing elevated NOx levels before the NOx levels actually exceed regulated limits. This may also provide an incentive to the operator, as productivity decreases with a derate in engine 110 performance. Also, if the trend of NOx emissions suggest that the future emissions will not be increasing or only slightly increasing from a current allowable level, controller 70 may determine that derating of engine 110 is not required or only minimally required at the present time. Even if derating is not required at a current time, controller 70 may continue to evaluate the trend of engine operating parameters to forecast future engine operating parameters.

It is further contemplated that controller 70 may progressively derate engine 110 dependent upon the difference between a predicted future emission level and a regulated limit. For example, if the predicted future emission level of engine 110 is slightly greater than the current emission level measured by sensor 140, but slowly trending upwards and substantially below a regulated limit, controller 70 may derate engine 110 to a lesser degree than when the predicted future emission level is very close to the maximum allowed by an applicable regulation, quickly trending upwards, and might soon violate the emissions regulations. This progressive derate of engine 110 by controller 70 may serve to place the operator of machine 100 on notice that certain preventative actions may be soon required, even before the current emission levels would suggest that such preventative actions would be required. In other words, controller 70 may progressively derate engine 110 in order to allow an operator of machine 100 more time to compensate, plan, and execute a required preventative action then an engine control system which only considers current emissions output and/or greatly derates engine 110 in response to any adverse emission level.

Positioning system 80 may utilize global positioning technology, a local coordinate system, a radio frequency transmitter, or any other system capable of determining a proximate location of machine. Positioning system 80 may be in electronic communication with the controller 70 and capable of outputting the current location of machine 100 in longitudinal and latitudinal coordinates, a zip code, city and town, or any other nomenclature capable of communicating a proximate location of machine 100. In one embodiment, the geographic location data may be utilized by controller 70 in determining an amount of derate.

INDUSTRIAL APPLICABILITY

The disclosed engine control system and method may provide efficient and accurate prediction based engine control. Such technology may be used with a wide range of machines and sensors, such as physical and/or virtual sensors for engines, structures, environments, and materials, etc. In particular, the disclosed system and method may prevent excessive emission levels before they occur by predicting a future emission level and derating the engine 110 accordingly. Further, the disclosed system and method may provide an operator incentive to perform maintenance, by limiting the power available to machine 100 when maintenance is required to further decrease emission levels. Still further, the disclosed system and method may prevent excessive emissions output and provide an operator incentive without requiring the vehicle be disabled and stranded. The operation of power system 102 will now be explained.

Referring to FIG. 2, air may be drawn into the combustion chambers 14 of engine 110 by air induction system 60 for subsequent combustion with fuel. Fuel may be injected into the combustion chambers 14 of engine 110 by fuel system 20, mixed with the air therein, and combusted by engine 110 to produce a mechanical work output and an exhaust flow of hot gases. The exhaust flow may contain a complex mixture of air pollutants composed of gaseous material, which can include oxides of nitrogen (NOx). The NOx laden exhaust flow may be directed from the combustion chambers 14 through exhaust system 112. The exhaust flow from engine 110 may then continue through exhaust system 112 and then be analyzed by sensor 140 for remaining constituents before being released to the atmosphere.

Figure 3:
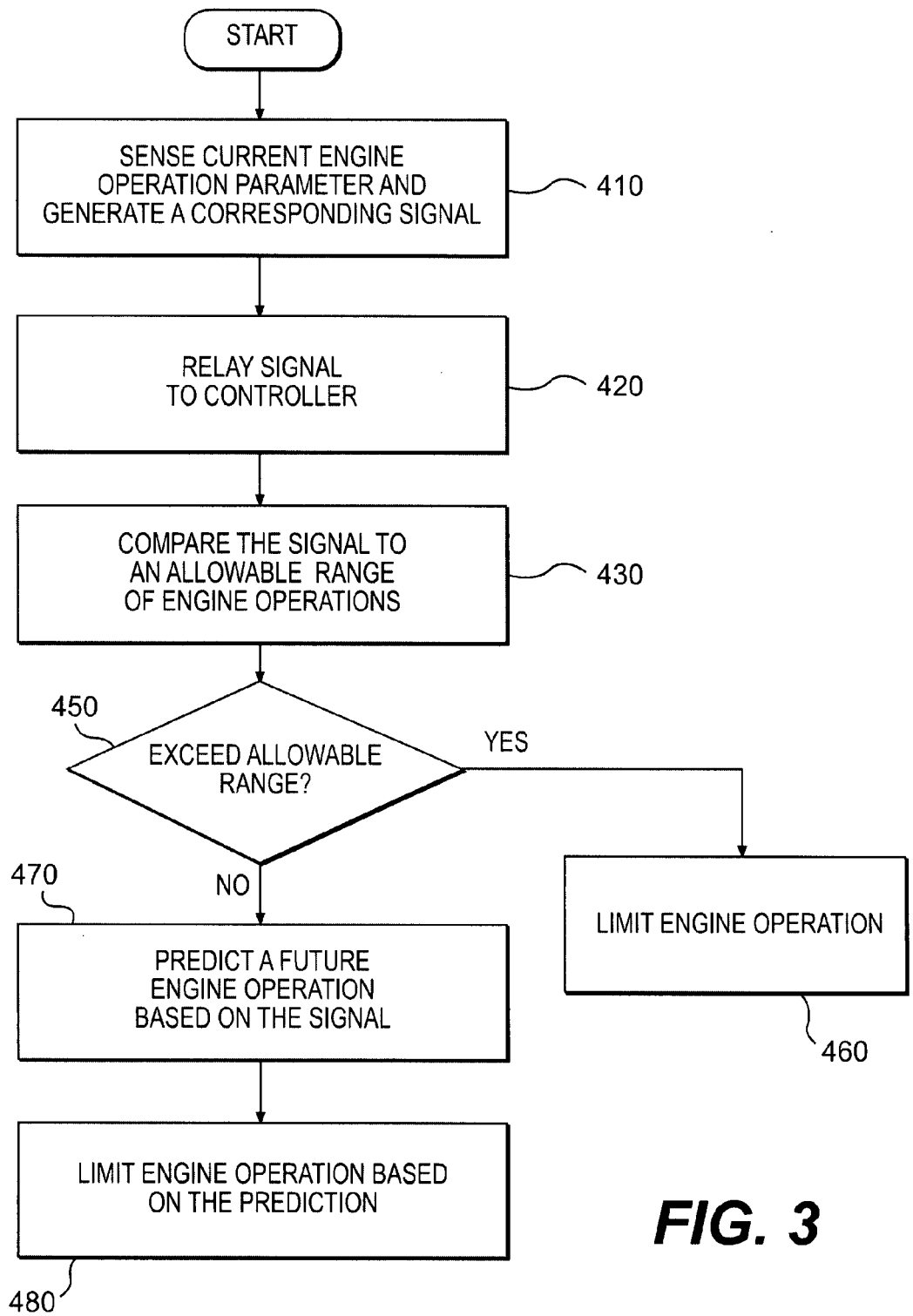
FIG. 3 is a flowchart depicting an exemplary method performed by the power system of FIG. 2.

As illustrated in the flowchart of FIG. 3, sensor 140 may measure a parameter indicative of current engine operation and then generate a corresponding signal. (Step 410) For example, sensor 140 may be a NOx detector and generate a signal corresponding to the current level of NOx constituents in the exhaust system 112. Alternatively, sensor 140 may be a virtual sensor that replaces a physical NOx detector and generates a signal corresponding to the current level of NOx constituents in the exhaust system 112 based on a different measured parameter. Next, the sensor 140 may relay the corresponding signal to controller 70. (Step 420) Upon receipt of the signal, controller 70 may compare the signal to an allowable range. (Step 430) For example, if the signal is indicative of current NOx emissions, controller 70 may compare the signal to the regulated limits of NOx allowed during operation of machine 100. If the signal falls outside of a current allowable threshold (Step 450; yes), controller 70 may limit engine 110 operation accordingly. (Step 460) For example, if the signal indicates that the current NOx emission level is above a regulated limit, controller 70 may cause engine 110 to derate or shut down to comply with regulations. Alternatively, if the signal indicates that the current NOx emission level is approaching the threshold (i.e., at 90% of the allowed emissions), controller 70 may limit the operation of engine 110 to decrease engine emissions and provide incentive for the operator to seek service for machine 100. If, however, the signal falls within a current allowable threshold (Step 450; no), then controller 70 may predict a future engine operation based on the signal. (Step 470) For example, if a signal indicative of NOx emissions is within a allowable range, then controller 70 may predict a future NOx emission level based in part on a current signal received from sensor 140. Based on this prediction, controller 70 may limit engine operation in anticipation of a predicted increase in emission levels, even where excessive levels are not currently detected. (Step 480)

In another embodiment of the disclosed engine control system, geographic location data provided by positioning system 80 may be utilized by controller 70 in determining an amount of derate. For example, controller 70 may derate engine 110 based both on a predicted future emission level and on a geographic location. Controller 70 may receive data relating to the geographic position of machine 100 via positioning device 80. Controller 70 may also receive or store data relating to the geographic position of certain service stations and repair facilities authorized and able to service machine 100 to reduce emission levels. For example, controller 70 may derate engine 110 more severely when it is determined that a service station is nearby and easily accessible, even with severely limited engine functions. Accordingly, when machine 100 is located a substantial distance away from a service station, control system may derate engine 110 to a lesser degree, to maintain more functionality and to allow the operator to reach the service station in a timely fashion, while still remaining within the regulated emission limits.

Because the disclosed engine control system and method may be predictive rather than reactive, they may offer substantial benefits over other engine control systems that only react to a measured increase in engine operating parameters. For example, after a high level of NOx emission has already been detected, known control systems greatly derate or even disable the machine. The disclosed engine control system, however, may predict a future emission level and allow the operator time to seek preventative actions or to seek a safe location before that emission level becomes excessive. Further, the disclosed engine control system and method may provide an incentive to an operator to seek maintenance before emission levels are too excessive to allow continued operation. Moreover, the predictive engine control system may provide parameters that are unavailable from a single physical sensor, such as a future emissions level or data from outside the sensing environment. The disclosed system and method may also be used by machine manufacturers to reduce cost and increase reliability by replacing costly or failure-prone physical sensors with the disclosed virtual sensor system. Reliability and flexibility may also be improved by adding backup sensing resources via the disclosed virtual sensor based predictive engine control system. The disclosed engine control system may be used to predict a wide range of parameters in components such as emission, engine, transmission, navigation, and/or control, etc. Further, because the disclosed engine control system and method may further utilize geographic location data to vary the rate of derate dependent upon proximity to an opportunity for maintenance, they may prevent excessive emission levels and provide an operator incentive to seek maintenance while maintaining enough power to allow an operator to navigate toward and obtain the required maintenance.

Other embodiments, features, aspects, and principles of the disclosed exemplary systems will be apparent to those skilled in the art and may be implemented in various environments and systems.

What is claimed is:

1. A prediction based engine control system, comprising:
   a sensor configured to sense a current engine operation and generate a corresponding signal; and
   a controller in communication with the sensor, the controller being configured to:
   receive the signal;
   compare the current engine operation indicated by the signal to an allowable range of engine operations;
   predict a future engine performance based on the signal by determining a future value of an engine operating parameter based on the current engine operation indicated by the signal; and
   limit the current engine operation based on the prediction, even when the current engine operation is within the allowable range of operation.

2. The engine control system of claim 1, wherein the current engine operation includes the production of at least one regulated emission constituent.

3. The engine control system of claim 2, wherein the limiting of engine operation includes limiting the available engine output.

4. The engine control system of claim 3, wherein the limiting of engine operation is proportional to the comparison of the current engine operation to the allowable range of engine operation.

5. The engine control system of claim 1, wherein the sensor is a NOx sensor.

6. The engine control system of claim 1, wherein the controller is configured to receive data relating to a geographical location of the engine and limit engine operation based on the data relating to the geographical location.

7. The engine control system of claim 6, wherein the limiting of engine operation based on a geographical location allows a mobile machine employing the engine control system to reach a service area before the current operation exceeds the allowable range of engine operation.

8. The engine control system of claim 6, wherein the controller is configured to derate the engine to limit engine operation and determine an amount of derate based on the geographical location of the engine.

9. The engine control system of claim 8, wherein the controller is configured to increase the amount of derate when the geographical location of the engine is closer to a particular location.

10. The engine control system of claim 1, wherein the signal indicates a sensed level of at least one regulated emission constituent, and the controller is configured to predict the future engine performance by calculating a future level of the at least one regulated emission constituent based on the sensed level.

11. The engine control system of claim 10, wherein the sensed level is sensed at predetermined intervals, and the controller is configured to predict the future level at a future interval.

12. A method for controlling an engine, comprising:
receiving a signal indicative of a current engine operation;
comparing the signal to an allowable range of engine operation;
predicting a future engine performance based on the signal by determining a future value of an engine operating parameter based on the current engine operation indicated by the signal;
limiting the current engine operation based on the prediction, even when the current engine operation is within the allowable range of engine operation.

13. The method of claim 12, wherein the current engine operation includes the production of at least one regulated emission constituent.

14. The method of claim 13, wherein the limiting of engine operation includes limiting the available engine output.

15. The method of claim 14, wherein the limiting of engine operation is proportional to the comparison of the current engine operation to the allowable range of engine operation.

16. The method of claim 12, wherein the signal is indicative of a NOx emissions level.

17. The method of claim 12, further including receiving data relating to a geographical location of the engine, wherein the limiting of engine operation is based further on the data relating to the geographical location.

18. The method of claim 17, wherein the limiting of engine operation based on the geographical location allows a mobile machine to reach a service area before the current operation exceeds the allowable range of engine operation.

19. A machine utilizing a prediction based engine control system comprising:
an engine;
an exhaust system associated with the engine;
a sensor configured to sense a current operation of the engine and generate a corresponding signal; and
a controller in communication with the engine and the sensor, the controller being configured to:
receive the signal;
compare the current engine operation indicated by the signal to an allowable range of engine operation;
predict a future engine operation based on the comparison by determining a future value of an engine operating parameter based on the current engine operation indicated by the signal if the current engine operation is within the allowable range of engine operation; and
limit the current engine operation based on the prediction, even when the current engine operation is within the allowable range of operation.

20. The machine of claim 19, wherein the current engine operation includes the production of at least one regulated emission constituent.

21. The machine of claim 20, wherein the limiting of current engine operation includes limiting the available engine output.

22. The machine of claim 21, wherein the limiting of engine operation is proportional to the comparison of the current engine operation to the allowable range of engine operation.

23. The machine of claim 19, wherein the sensor is a NOx sensor.

24. The machine of claim 19, wherein the controller is configured to:
receive data relating to a geographical location of the machine; and
determine a location of a service area based on the data relating to the geographical location to limit the current engine operation while allowing the machine to reach the service area before the current engine operation exceeds the allowable range of engine operation.

* * * * *